US011954085B1

(12) United States Patent
Srivatsa et al.

(10) Patent No.: US 11,954,085 B1
(45) Date of Patent: Apr. 9, 2024

(54) HIERARCHICAL DATA SKIPPING USING DATA SKETCHES

(71) Applicant: International Business Machines Corporation, Armonk, NY (US)

(72) Inventors: Mudhakar Srivatsa, White Plains, NY (US); Raghu Kiran Ganti, White Plains, NY (US); Joshua M. Rosenkranz, White Plains, NY (US); Linsong Chu, White Plains, NY (US); Tuan Minh Hoang Trong, Jackson Heights, NY (US); Utpal Mangla, Toronto (CA); Satishkumar Sadagopan, Leawood, KS (US); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/934,440

(22) Filed: Sep. 22, 2022

(51) Int. Cl.
*G06F 16/00* (2019.01)
*G06F 16/22* (2019.01)
*G06F 16/2455* (2019.01)
*G06F 16/28* (2019.01)

(52) U.S. Cl.
CPC .... *G06F 16/2246* (2019.01); *G06F 16/24556* (2019.01); *G06F 16/282* (2019.01)

(58) Field of Classification Search
None
See application file for complete search history.

(56) References Cited

U.S. PATENT DOCUMENTS

| | | |
|---|---|---|
| 6,327,574 B1 | 12/2001 | Kramer et al. |
| 6,839,701 B1 | 1/2005 | Baer et al. |
| 7,133,865 B1 | 11/2006 | Pedersen et al. |
| 7,286,724 B2 | 10/2007 | Seol et al. |
| 8,856,185 B2 | 10/2014 | Balassanian |
| 9,659,045 B2 | 5/2017 | Liu et al. |
| 10,262,012 B2 * | 4/2019 | Liu .................. G06F 16/86 |

(Continued)

OTHER PUBLICATIONS

Mell et al., "The NIST Definition of Cloud Computing," Recommendations of the National Institute of Standards and Technology, Special Publication 800-145, Sep. 2011, 7 pages.

*Primary Examiner* — Farhan M Syed
(74) *Attorney, Agent, or Firm* — Yee & Associates, P.C.

(57) ABSTRACT

A computer implemented method performs data skipping in a hierarchically organized computing system. A group of processor units determines leaf node data sketches for data in leaf nodes in the hierarchically organized computing system. The leaf node data sketches summarize attributes of data in the leaf nodes. The group of processor units aggregates the leaf node data sketches at intermediate nodes in the hierarchically organized computing system to form aggregated data sketches at the intermediate nodes and retains data sketches received at the intermediate nodes from a group of child nodes to form retained data sketches. The retained data sketches are one of leaf node data sketches and the aggregated data sketches. The group of processor units searches the data using the retained data sketches and the data skipping within the hierarchically organized computing system in response to queries made to the intermediate nodes in the hierarchically organized computing system.

17 Claims, 14 Drawing Sheets

(56) References Cited

U.S. PATENT DOCUMENTS

| | | |
|---|---|---|
| 11,036,797 B2 | 6/2021 | Hood |
| 11,113,286 B2 | 9/2021 | Cruanes et al. |
| 11,204,906 B2 * | 12/2021 | LeTourneau .......... G06F 16/282 |
| 2017/0046367 A1 | 2/2017 | Chang et al. |
| 2017/0060912 A1 * | 3/2017 | Liu .................... G06F 16/2255 |
| 2018/0357262 A1 * | 12/2018 | He ........................ G06F 16/285 |
| 2019/0121795 A1 * | 4/2019 | Schiffmann ........... G06F 16/245 |
| 2020/0311088 A1 | 10/2020 | Khazma et al. |
| 2021/0406240 A1 * | 12/2021 | Sheppard ............. G06F 16/2246 |
| 2022/0188334 A1 * | 6/2022 | Chen ................... G06F 16/2455 |
| 2023/0132648 A1 * | 5/2023 | Blume ................ G06F 16/2246 |
| | | 707/687 |

\* cited by examiner

US 11,954,085 B1

HIERARCHICAL DATA SKIPPING USING DATA SKETCHES

BACKGROUND

1. Field

The disclosure relates generally to an improved computer system and more specifically to a computer implemented method, apparatus, system, and computer program code for querying data in a physically distributed hierarchically organized computing environment.

2. Description of the Related Art

Computing environments can generate large amounts of data. For example, many data processing networks can be in geographically distributed locations all over the world. These networks can be organized into hierarchies in which nodes can be geographically distributed. Examples of computing environments with hierarchies that can be geographically distributed include industrial plants and telecommunications networks. For example, industrial plants can have a hub spoke architecture. A telecommunications network can be organized into a hierarchy that also is geographically distributed.

Within these networks, large amounts of data can be generated, and activities can be performed on the data. For example, the data can be accessed from measuring metrics, performing computing operations, entering data, deleting data, moving databases, and other activities. The data can be in different locations. In some architectures, the data can be centralized in one location or a few locations. For example, data centers can be used to process, store, and disseminate data. In other architectures, the data can be distributed through many nodes in the computing environment. For example, nodes in a telecommunications network can measure and collect metrics and can log information that can be used for analysis of the health and performance of the telecommunications network.

SUMMARY

According to one illustrative embodiment, a computer implemented method provides data skipping in a hierarchically organized computing system. A group of processor units determines leaf node data sketches for data in leaf nodes in the hierarchically organized computing system. The leaf node data sketches summarize attributes of the data in the leaf nodes. The group of processor units aggregates the leaf node data sketches at intermediate nodes in the hierarchically organized computing system to form aggregated data sketches at the intermediate nodes. The group of processor units retains data sketches received at the intermediate nodes from a group of child nodes to form retained data sketches. The retained data sketches are one of leaf node data sketches and the aggregated data sketches. The group of processor units searches the data using the retained data sketches and the data skipping within the hierarchically organized computing system in response to queries made to the intermediate nodes in the hierarchically organized computing system. According to other illustrative embodiments, a computer system and a computer program product for data skipping in a hierarchically organized computing system are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
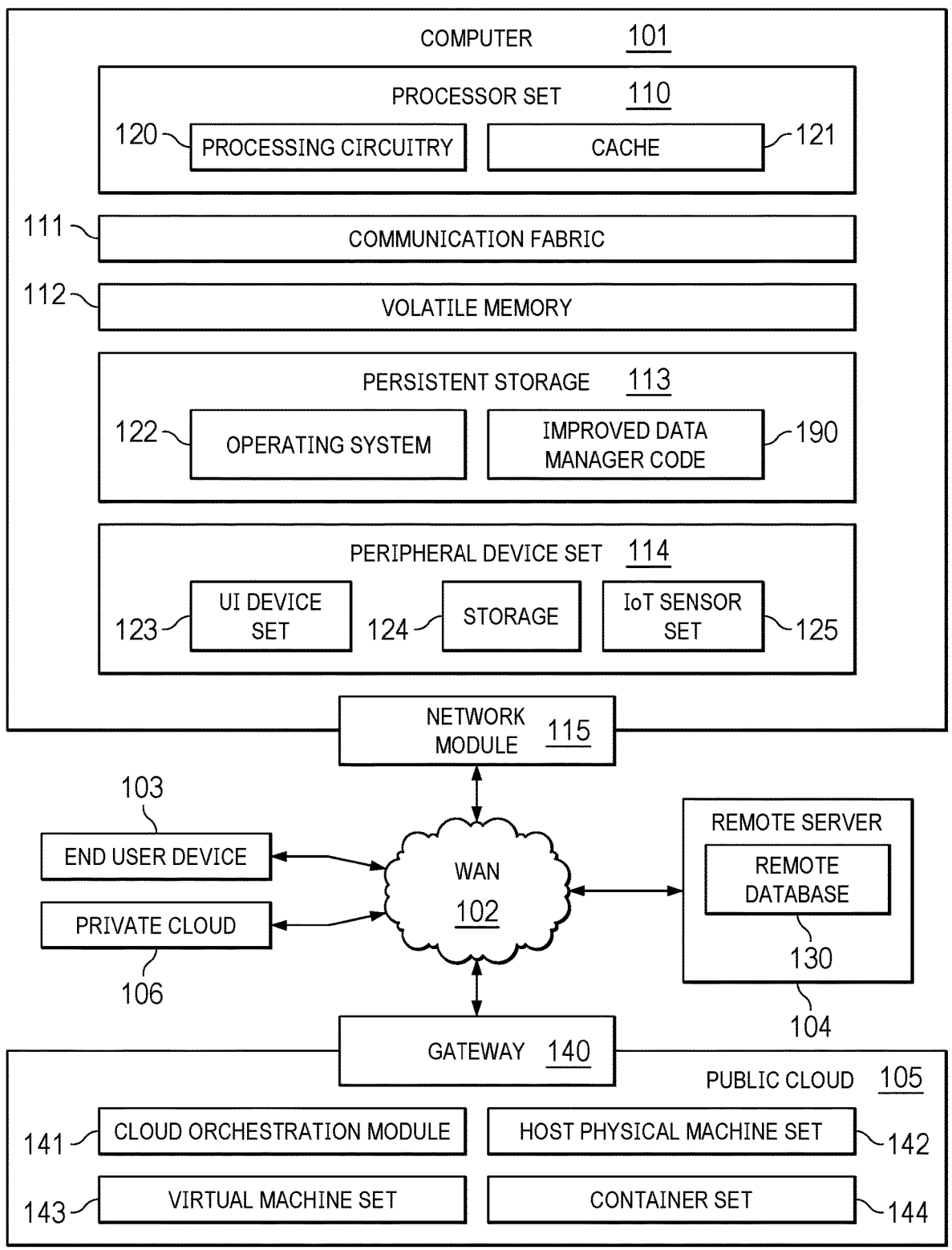
FIG. 1 is a block diagram of a computing environment in which illustrative embodiments can be implemented.

With reference now to the figures, in particular, with reference to FIG. 1, a block diagram of a computing environment is depicted in which illustrative embodiments may be implemented. Computing environment 100 contains an example of an environment for the execution of at least some of the computer code involved in performing the inventive methods, such as improved data manager code 190. In this illustrative example, improved data manager code 190 can improve the use of network resources. For example, improved data manager code 190 can reduce the use of storage resources through generating data sketches. Further, searching of data can be improved using improved data manager code 190 to search for data using the data sketches and data skipping processes implemented in improved data manager code 190. In addition to improved data manager code 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and improved data manager code 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block improved data manager code 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in improved data manager code 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, the illustrative embodiments recognize and take into account that current techniques store data in centralized location. In a telecommunications network, the data can be collected from nodes, such as base station, a serving gateway, a packet gateway, mobile devices, vehicles, aircraft, mobile phones, or other computing systems. The metrics can include can location, signal strength, data downloaded, and other metrics of interest in the telecommunications network.

The storage of data in a centralized location, such as a public cloud in a cloud computing environment, can have security concerns. Breaches of security can result unauthorized access to the large amounts of data collected from the endpoints.

Further, the sending of from endpoints to storage consumes network and processing resources. The amount of resource use increases as the number of endpoints increases. The increase in endpoints can result in the need for additional infrastructure is needed to collect and store the data from endpoints.

In one example, data can be distributed and remain at the endpoints. Queries for data can use large amounts of network resources to query all of the nodes to and receive responses for the endpoints.

Thus, the illustrative embodiments provide a computer implemented method, apparatus, system, and computer program product for processing data. In one illustrative example, a computer implemented method determines leaf node data sketches for data in leaf nodes in the hierarchically organized computing system. The leaf node data sketches summarize attributes of the data in the leaf nodes. The leaf node data sketches are aggregated at intermediate nodes in the hierarchically organized computing system to form aggregated data sketches at the intermediate nodes. Data sketches received at the intermediate nodes from a group of child nodes are retained to form a group of retained data sketches. The group of retained data sketches is used to determine data skipping within the hierarchically organized computing system in response to queries made to nodes in the hierarchically organized computing system.

As used herein, a "group of" when used with reference to items means one or more items. For example, a group of child nodes is one or more child nodes.

As used herein, "a number of" when used with reference to items, means a group of one or more items. For example, "a number of different types of networks" is a group of one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
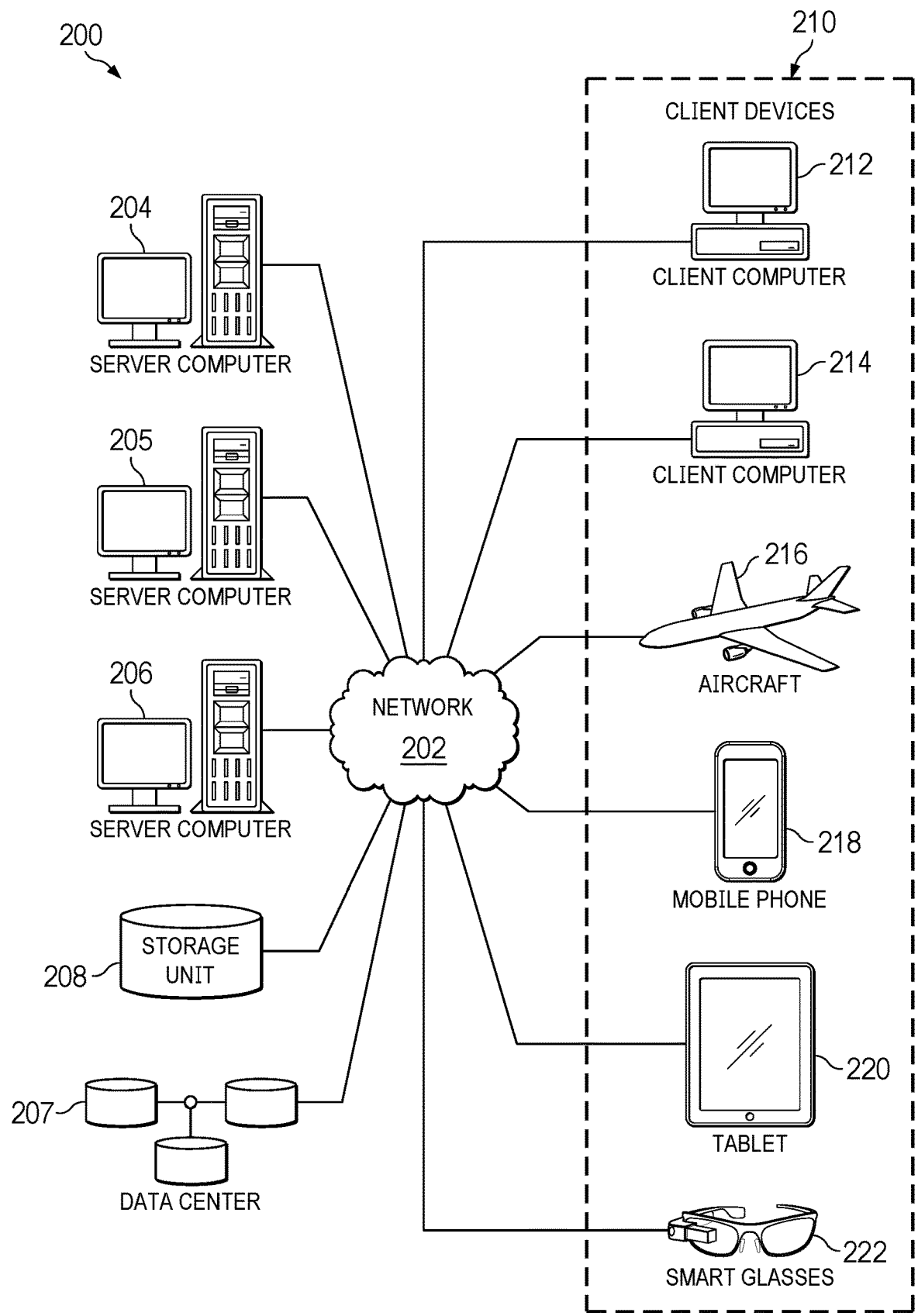
FIG. 2 is a pictorial representation of a network of data processing systems in which illustrative embodiments may be implemented.

With reference now to FIG. 2, a pictorial representation of a network of data processing systems is depicted in which illustrative embodiments may be implemented. Network data processing system 200 is a network of computers in which the illustrative embodiments may be implemented. Network data processing system 200 contains network 202, which is the medium used to provide communications links between various devices and computers connected together within network data processing system 200. Network 202 can include connections, such as wire, wireless communication links, or fiber optic cables.

In the depicted example, server computer 204, server computer 205, server computer 206, and data center 207 connect to network 202 along with storage unit 208. In addition, a number of client devices 210 connect to network 202. As depicted, client computer 212 and client computer 214 are examples of client devices 210. Client devices 210 can be, for example, computers, workstations, or network computers. In the depicted example, server computer 204 provides information, such as boot files, operating system images, and applications to client devices 210. Further, a number of client devices 210 can also include other types of client devices such as aircraft 216, mobile phone 218, tablet 220, and smart glasses 222. In this illustrative example, server computer 204, server computer 206, storage unit 208, and client devices 210 are network devices that connect to network 202 and network 202 is the communications media for these network devices. Some or all of client devices 210 may form an Internet-of-things (IoT) in which these physical devices can connect to network 202 and exchange information with each other over network 202.

Client devices 210 are clients to server computer 204 in this example. Network data processing system 200 may include additional server computers, client computers, and other devices not shown. A number of client devices 210 connect to network 202 utilizing at least one of wired, optical fiber, or wireless connections.

Program code located in network data processing system 200 can be stored on a computer-recordable storage media and downloaded to a data processing system or other device for use. For example, program code can be stored on a computer-recordable storage media on server computer 204 and downloaded to client devices 210 over network 202 for use on client devices 210.

In the depicted example, network data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 200 also may be implemented using a number of different types of networks. For example, network 202 can be comprised of at least one of the Internet, an intranet, a local area network (LAN), a metropolitan area network (MAN), or a wide area network (WAN). FIG. 2 is intended as an example, and not as an architectural limitation for the different illustrative embodiments.

In this illustrative example, network data processing system 200 can be hierarchically organized to be a hierarchically organized computing system. In other words, different computing devices within network data processing system 200 can be located on different levels in a hierarchy. For example, server computer 205 can be a root node while server computer 204, server computer 206, and data center 207 are intermediate nodes on a level below server computer 206. Client devices 210 can be the end points in the hierarchy. When client devices 210 are endpoints, client devices 210 are referred to as leaf nodes.

In this illustrative example, client devices 210 contain data that may be of interest for analysis. For example, client devices 210 may perform metric collection and log collection. This data can be collected from client devices 210 and analyzed.

Instead of aggregating the data from client devices 210 in storage unit 208, the data is retained at client devices 210. In this illustrative example, data sketches are used to facilitate efficient querying of data in client devices 210. A data sketch is a summary of data in a client device such as client computer 212 or aircraft 216.

In the depicted example, the data sketch identifies attributes of data in a client device such as client computer 214 or mobile phone 218. These attributes can be for information of interest that may be searched for in a query. The data sketch can be analyzed to determine whether information searched for using a query may be present in the data at any client device for which the data sketch was created.

In this illustrative example, leaf node data sketches are generated by client devices 210. These leaf node data sketches are generated by one or more client devices in client devices 210 that contain data. In the illustrative example, these leaf nodes data sketches are propagated up the hierarchy to intermediate nodes that are parent nodes to client devices 210.

These intermediate nodes aggregate the leaf node data sketches. In this example, intermediate nodes that are parent nodes to client devices 210 are server computer 204 and server computer 206. For example, server computer 204 is a parent node to client computer 212, client computer 214, aircraft 216. Server computer 206 is a parent node to mobile phone 218, tablet 220, and smart glasses 222.

As depicted, data center 207 is a parent node to server computer 204 and server computer 206. In this example, server computer 204 and server computer 206 are in a level in the hierarchy lower than data center 207. As depicted, data center 207 is on a level below the root node, server computer 205.

An intermediate node such as server computer 204 can receive leaf node data sketches from leaf nodes such as client computer 212, client computer 214, aircraft 216. As another example, server computer 206 is another intermediate node that can receive data sketches from mobile phone 218, tablet 220, and smart glasses 222.

Each of these intermediate nodes aggregates the leaf node data sketches received from client devices that are child nodes directly below these intermediate nodes in the hierarchy. For example, server computer 204 aggregates leaf node data sketches received from client computer 212, client computer 214, and aircraft 216. As another example, server computer 206 aggregates leaf node data sketches received from mobile phone 218, tablet 220, and smart glasses 222.

These intermediate nodes propagate the data sketches generated from the aggregation of leaf node data sketches to another intermediate node, which is data center 207 in this example. Data center 207 aggregates the data sketches received from server computer 204 and server computer 206 to form another aggregated data sketch. These data sketches received by data center 207 are the aggregated data sketches that the intermediate nodes generated from aggregating leaf node data sketches. Data center 207, in this illustrative example, propagates the aggregated data sketch generated by data center 207 to the root node, server computer 205.

In these illustrative examples, each of the intermediate nodes retains a copy of data sketches received from child nodes. For example, server computer 204 retains leaf node data sketches received from client computer 212, client computer 214, and aircraft 216. Server computer 206 retains leaf node data sketches received from mobile phone 218, tablet 220, and smart glasses 222. In a similar fashion, data center 207 retains the aggregated data sketches received from server computer 204 and server computer 206. The root node, server computer 206, retains the aggregated data sketch received from data center 207.

In this illustrative example, data can be queried using the data sketches and data skipping. Data skipping identifies instances in which queried data does not match a reference value. With data skipping, the query is used to determine where the data is not found in contrast to other query techniques that identify where the data can be found.

A data sketch is a summary of the data that may be present. The data sketch does not contain the actual data. This summary can be, for example, indexes that identify ranges of values and wild card characters for data.

For example, in searching a column in the table, with data skipping, a data sketch can identify a range of data or matching values present in columns in the table. If the query is for a value outside of the range or matching values, then that column is skipped in the search. The data sketch is a summary of the data that may be present but not the actual data.

Thus, with data skipping, if the data sketch for a node indicates that the data responsive to the query is not present, then that node is skipped because the node does not need to process the query.

When an intermediate node receives a query, the intermediate node determines whether the data responsive to the query is not present in a node or nodes that are child nodes to the intermediate node using the data sketches received from the child nodes.

For example, if a query is received by data center 207 from a requester, data center 207 searches the aggregated data sketch received from server computer 204 and server computer 206 to determine whether data will not be found in these intermediate nodes. If the search of the aggregated data sketch received from server computer 206 indicates that the data is absent, but the search of aggregated data sketch received from server computer 204 does not indicate that the data is absent, data center 207 sends the query to server computer 204 but not to server computer 206 as part of the data skipping process.

In response, server computer 204 searches the leaf data sketches received from client computer 212, client computer 214, and aircraft 216. The query is propagated or sent to any of those leaf nodes that do not indicate that the data of interest is absent. In this example, the number of leaf nodes that are searched using the query can be reduced. For example, if the leaf node data sketch from aircraft 216 and leaf node data sketch from client computer 214 indicate that the data of interest in the query may be present in those nodes, server computer 204 sends the query to client computer 214 and aircraft 216.

In response, these leaf nodes, client computer 214 and aircraft 216, perform queries on the data located on those leaf nodes and return responses. At these leaf nodes, the querying can also be performed using the data sketches generated by the leaf nodes to determine what columns, tables, or other data structures can be skipped in searching for data that matches the query. These responses are returned to data center 207. These responses can be propagated back up the hierarchy or can be sent directly to data center 207. Data center 207 combines responses received from client computer 214 and aircraft 216 and returns the combined responses in a reply to the requester.

Figure 3:
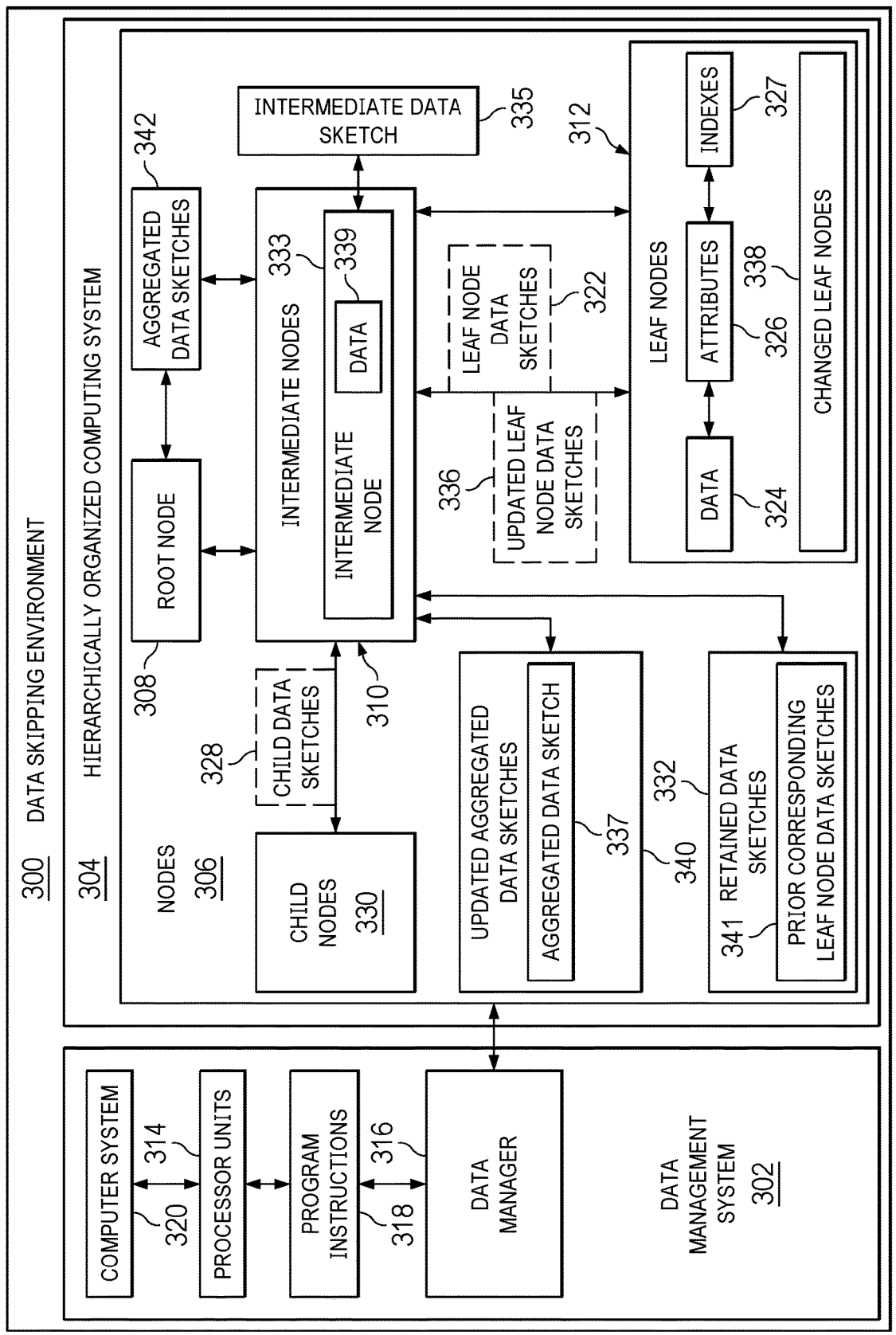
FIG. 3 is a block diagram of a data skipping environment in accordance with an illustrative embodiment.

With reference now to FIG. 3, a block diagram of a data skipping environment is depicted in accordance with an illustrative embodiment. In this illustrative example, data skipping environment 300 includes components that can be implemented in hardware such as the hardware shown in network data processing system 200 in FIG. 2.

As depicted, data management system 302 can manage data for hierarchically organized computing system 304. In this illustrative example, hierarchically organized computing system 304 can be a computer network, a local area network, a wide area network, telecommunications system, a sensor network, or some other computing system that has a hierarchical organization. As depicted, hierarchically organized computing system 304 comprises nodes 306 organized into a hierarchy with root node 308, intermediate nodes 310, and leaf nodes 312.

Nodes 306 are computing systems that can take a number of different forms. For example, nodes 306 can be selected from at least one of a computing device, a mobile device, an aircraft, a ship, a ground vehicle, a mobile phone, or a computer, a data center, a computer cluster, a router, a gateway, a serving gateway, a packet gateway, or other types of computing systems. A node can be comprised of a single computer, or a system of computers or other computing devices that are grouped physically or logically.

In the illustrative example, intermediate nodes 310 can be, for example, data centers, computer clusters, routers, gateways, serving gateways, packet gateways, or some other suitable computing systems. Leaf nodes 312 can be, for example, computing devices, mobile devices, aircraft, ships, ground vehicles, mobile phones, or other similar computing devices. Root node 308 can take a number of different forms. For example, root node 308 can be a cloud, a data center, or some other suitable type of computing system.

In this illustrative example, data management system 302 comprises a group of processor units 314 and data manager 316. Data manager 316 can be implemented in software, hardware, firmware, or a combination thereof. When software is used, the operations performed by data manager 316 can be implemented in program instructions configured to run on hardware, such as a processor unit. When firmware is used, the operations performed by data manager 316 can be implemented in program instructions and data and stored in persistent memory to run on a processor unit. When hardware is employed, the hardware can include circuits that operate to perform the operations in data manager 316.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As depicted, the group of processor units 314 is capable of executing program instructions 318 implementing processes in the illustrative examples. As used herein a processor unit in the group of processor units 314 is a hardware device and is comprised of hardware circuits such as those on an integrated circuit that respond to and process instructions and program instructions that operate a computer. When the group of processor units 314 executes program instructions 318 for a number or processes, the group of processor units 314 is one or more processor units that can be on the same computer or on different computers. In other words, the number of processes can be distributed between processor units 314 on the same or different computers.

Further, the group of processor units 314 can be of the same type or different types of processor units. For example, the group of processor units 314 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, the group of processor units 314 can be located in some or all of nodes 306. With this example, data manager 316 can be distributed across some or all of nodes 306 to perform different steps in the illustrative examples. In another illustrative example, processor units 314 can be located separately from nodes 306 such as in computer system 320. Computer system 320 can be a hardware system of one or more computers that are in communication with each other. In this example, data manager 316 runs in computer system 320 and can be located in a single computer or can be distributed across multiple computers in computer system 320 that contains more than one computer.

In one illustrative example, data manager 316 determines leaf node data sketches 322 for data 324 in leaf nodes 312 in hierarchically organized computing system 304. Leaf node data sketches 322 summarize attributes 326 of data 324 in leaf nodes 312. For example, leaf nodes 312 can determine indexes 327 for attributes 326. These indexes can form leaf node data sketches 322 in this illustrative example.

In this illustrative example, attributes 326 can be, for example, selected from at least one of a host/subnet, a domain name, a request code, a response code, a geohash, a volume, or other suitable attribute for data 324 in leaf nodes 312. Indexes 327 can take different forms. For example, indexes 327 can be selected from at least one of a common prefix, a bloom filter, a count min sketch, a set, a min-max, or other suitable types of indexes.

In this illustrative example, the determining of leaf node data sketches 322 by data manager 316 can occur by data manager 316 causing leaf nodes 312 to generate leaf node data sketches 322 for data 324. In another illustrative example, data manager 316 can determine leaf node data sketches 322 by identifying or locating leaf node data sketches 322 that have already been generated by leaf nodes 312.

As depicted in this example, data manager 316 aggregates leaf node data sketches 322 at intermediate nodes 310 in hierarchically organized computing system 304 to form aggregated data sketches 342 at intermediate nodes 310. In this illustrative example, each intermediate node can have an aggregated data sketch.

In the illustrative example, this aggregation can occur through root node 308 in hierarchically organized computing system 304. Root node 308 can also have an aggregated data sketch in aggregated data sketches 342.

As depicted, data manager 316 retains child data sketches 328 received at intermediate nodes 310 from a group of child nodes 330 to form a group of retained data sketches 332. A child node is a node directly connected to another node moving away from root node 308 in the hierarchy. A child node is an immediate descendant from another node, which is the parent node.

In this illustrative example, a child node can be a leaf node in leaf nodes 312 having a direct connection to an intermediate node in intermediate nodes 310. In other words, a leaf node is a child node in which that leaf node is in a hierarchy below an intermediate node and has a direct connection to that intermediate node. A child node can also be a first intermediate node in intermediate nodes 310 that is in a lower level in the hierarchy to a second intermediate node in intermediate nodes 310 and with the first intermediate node having a direct connection to the second intermediate node.

Child data sketches 328 can be received from a group of child nodes 330 at an intermediate node in intermediate nodes 310 for aggregation to form aggregated data sketches 342. These data sketches received from the group of child nodes 330 can be leaf node data sketches 322 or can be aggregated data sketches 342. The type of data sketch received in child data sketches 328 can depend on whether child nodes 330 that are sending child data sketches 328 are leaf nodes 312 or other intermediate nodes in intermediate nodes 310 below the intermediate nodes 310 that are receiving child data sketches 328.

As a result, a data sketch in child data sketches 328 can be an aggregated data sketch generated by an intermediate node that is a child to another intermediate node. In another example, a data sketch in child data sketches 328 can be a leaf node data sketch received from a child node in the form of a leaf node. Thus, child data sketches 328 can include leaf node data sketches 322 and aggregated data sketches 342. Thus, data manager 316 aggregates leaf node data sketches 322 at intermediate nodes 310 to form aggregated data sketches 342. Depending on the type of data sketch received at an intermediate node in intermediate nodes 310, this aggregation could comprise one of aggregating leaf node data sketches 322 and aggregating aggregated data sketches 342.

The group of retained data sketches 332 is used to determine data skipping within the hierarchically organized computing system in response to queries made to nodes in the hierarchically organized computing system. Retained data sketches 332 are indexes that can be used to determine how a query received at a node, such as an intermediate node in intermediate nodes 310, should be propagated downward in the hierarchically organized computing system 304 to child nodes 330. The propagation of the query is used to determine what nodes can be skipped and what nodes need to process the query in these illustrative examples.

In this illustrative example, a leaf node data sketch in leaf node data sketches 322 received by an intermediate node in intermediate nodes 310 is retained by that intermediate node as a retained data sketch in child data sketches 328. An aggregated data sketch in aggregated data sketches 342 received from a child intermediate node by a parent intermediate node is retained by that parent intermediate node as a retained data sketch in retained data sketches 332. In other words, a data sketch retained in an intermediate node can be a leaf node data sketch or an aggregated data sketch.

In another illustrative example, an intermediate node 333 in intermediate nodes 310 can also be a data generator. In this instance, intermediate node 333 generates intermediate data sketch 335 for the data 339 in intermediate node 333. In this example, intermediate node 333 generates aggregated data sketch 337 using child data sketches 328 received from child nodes 330 by intermediate node 333 and intermediate data sketch 335.

In this illustrative example, the different data sketches generated in hierarchically organized computing system 304 can be updated in response to an event. The event can be one of a periodic event or a nonperiodic event. A periodic event can be a period of time selected from 35 seconds, 7 minutes, one hour, two days, or some other period of time. With a periodic event, the amount of time can depend on how often data changes, how often the hierarchically organized computing system changes configuration, and other factors. The nonperiodic event can be, for example, a user request, the addition of a node to nodes 306, the removal of a node from nodes 306, a change in a node in nodes 306, or some other event.

As depicted, data manager 316 can update leaf node data sketches 322 from data 324 in leaf nodes 312 in response to the event to form updated leaf node data sketches 336. Data manager 316 can aggregate updated leaf node data sketches 336 at intermediate nodes 310 in hierarchically organized computing system 304. This aggregation can occur through root node 308 in hierarchically organized computing system 304.

The event can be, for example, a change in leaf nodes 312. Changed leaf nodes 338 can take a number of different forms. For example, changed leaf nodes 338 can include at least one of a new leaf node added to leaf nodes 312, a leaf node removed from leaf nodes 312, a change in data 324 in a leaf node, or some other change in leaf nodes 312. This change can be any change in leaf nodes 312 that affects data 324 that is present for generating leaf node data sketches 322.

In this illustrative example, data manager 316 can update leaf node data sketches 322 from data 324 in leaf nodes 312 by determining updated leaf node data sketches 336 from data 324 in changed leaf nodes 338 in leaf nodes 312. Data manager 316 can aggregate updated leaf node data sketches 336 at intermediate nodes 310 in hierarchically organized computing system 304. In this depicted example, updated leaf node data sketches 336 replace prior corresponding leaf node data sketches 341 for aggregation at intermediate nodes 310 to form updated aggregated data sketches 340. In this example, prior corresponding leaf node data sketches 341 are retained data sketches 332 that have new or updated leaf node data sketches 336.

In this example, not all of aggregated data sketches 342 are necessarily aggregated again. For example, if only a portion of leaf node data sketches 322 are updated with updated leaf node data sketches 336, the aggregation is performed at intermediate nodes receiving updated leaf node data sketches 336. The intermediate node can generate an updated aggregated data sketch by aggregating retained data sketches 332 after replacing prior corresponding leaf node data sketches 341 with updated leaf node data sketches 336 that are received by that intermediate node. This intermediate node generates an updated aggregated sketch that is sent to a parent intermediate node of the intermediate node.

In response, the parent intermediate node generates a new updated aggregated data sketch using the same process as the child intermediate node. This updating can be performed through the hierarchy of intermediate nodes 310. Thus, the generation of updated leaf node data sketches 336 can result in the reaggregation of child data sketches 328 received by intermediate nodes 310. This reaggregation can occur throughout the hierarchy and through root node 308. This reaggregation of child data sketches 328 provides an updated index to perform searches in response to queries that may be made to nodes 306 in hierarchically organized computing system 304.

Figure 4:
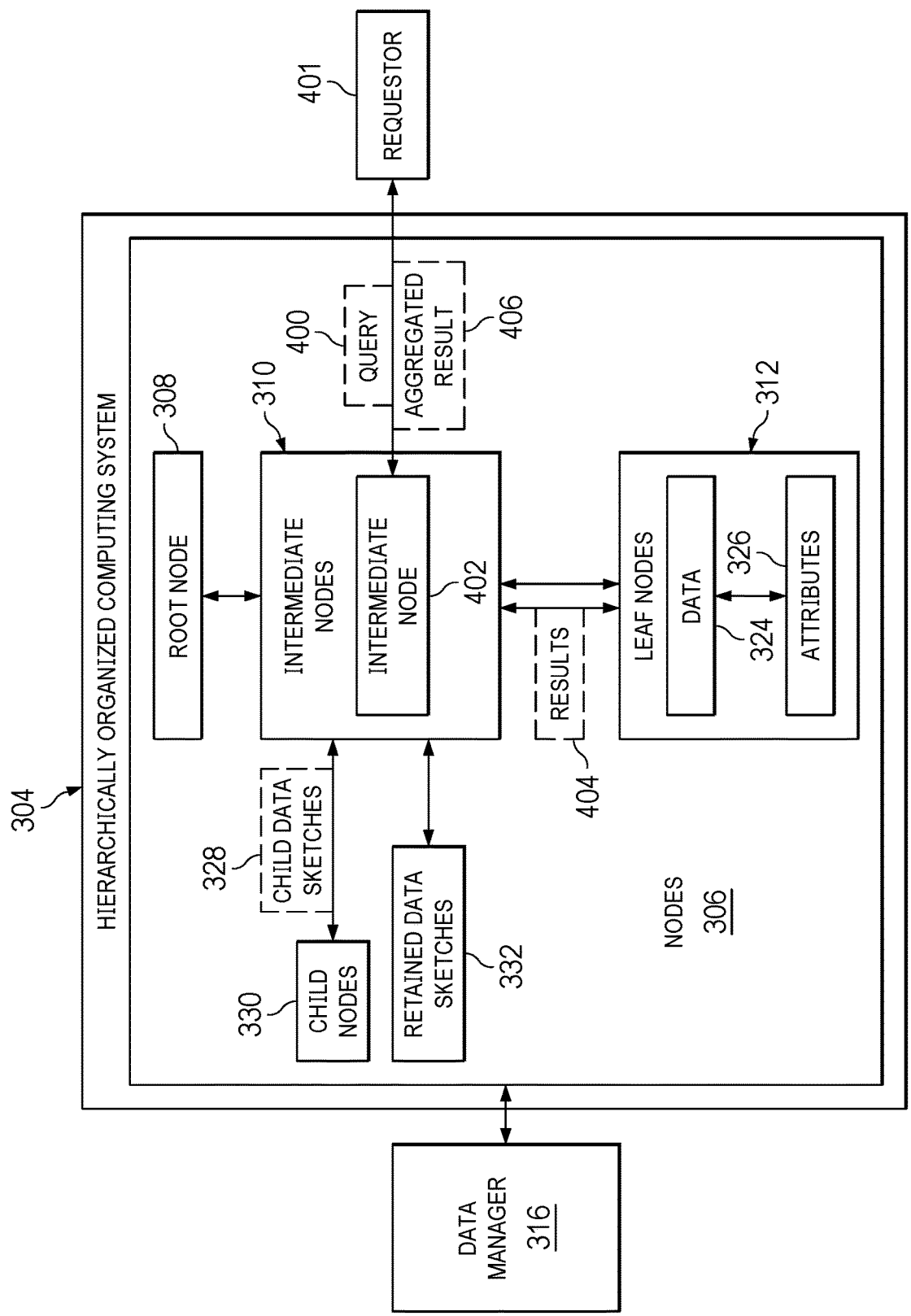
FIG. 4 is an illustration of dataflow in the processing of a query in a hierarchically organized computing system using data sketches in accordance with an illustrative embodiment.

With reference next to FIG. 4, an illustration of dataflow in the processing of a query in a hierarchically organized computing system using data sketches is depicted in accordance with an illustrative embodiment. As depicted, query 400 is received from requestor 401 at intermediate node 402 in the intermediate nodes 310. In response to receiving query 400, data manager 316 compares query 400 to the group of retained data sketches 332 at intermediate node 402.

In the illustrative example, data manager 316 can be a distributed process in which data manager 316 can be distributed to a portion or all of nodes 306 to perform different steps in the illustrative examples to process queries. In this example, program instructions for processes in data manager 316 can reside on nodes 306 such as intermediate node 402. Program instructions for processes in data manager 316 can be run on other nodes in nodes 306 to perform different steps in the illustrative examples. In another illustrative example, data manager 316 can be remote to intermediate nodes 310 and send instructions and commands to intermediate nodes 310 to perform different steps including processing query 400.

In this illustrative example, data manager 316 does not send query 400 to those child nodes in the group of child nodes 330 that do not have a match to query 400. Data manager 316 sends query 400 to a set of child nodes 330 in the group of child nodes 330 based on whether matches are present to a set of retained data sketches 332 at intermediate node 402 for a set of child nodes 330. In this illustrative example, a child node in the group of child nodes 330 without a match to an associated retained data sketch in retained data sketches 332 at the intermediate node 402 is skipped.

In this example, the group of child nodes 330 are nodes 306 that send a group of child data sketches 328 to intermediate node 402 to form a group of retained data sketches 332 used by intermediate node 402 to process queries received by intermediate node 402. The set of child nodes 330 can be a subset of or all of child nodes 330 in the group of child nodes 330. Additionally, as used herein, a "set of" when used with reference to child nodes 330 items means zero or more of child nodes 330. A set of child nodes 330 to intermediate node 402 can be an empty set if a match is not present between query 400 and the group of retained data sketches 332 for intermediate node 402. If the set of child nodes 330 are not leaf nodes 312, the set of child nodes 330 is a set of intermediate node 310. In this example, data manager 316 can continue to compare query 400 to retained data sketches 332 at the set of intermediate nodes 310 with query 400 being sent down the hierarchy through intermediate nodes 310 until a set of leaf nodes 312 receives query 400 for processing.

Data manager 316 runs query 400 on data 324 in the set of leaf nodes 312 that receive query 400. A group of results 404 is from this query on data 324 and the set of leaf nodes 312.

The group of results 404 is sent by the set of leaf nodes 312 to intermediate node 402. In one illustrative example, the group of results 404 can be sent by the set of leaf nodes 312 up to the hierarchy of intermediate nodes 310 to reach intermediate node 402. In other words, the group of results 404 can be sent on the same path back up the hierarchy to intermediate node 402 as used to send query 400 to each of the set of leaf nodes 312.

In another illustrative example, the set of results 404 can be sent from the set of leaf nodes 312 directly to intermediate node 402. In this example, less processing may occur by not passing the set of results 404 from node to node in intermediate nodes 310 until intermediate node 402 receives set of results 404.

In this illustrative example, data manager 316 aggregates a group of results 404 received in response to query 400 to form aggregated result 406. Aggregated result 406 is returned to requestor 401.

In one illustrative example, one or more solutions are present that overcome a problem with performance in querying data in a hierarchically organized computing system and reduce resource usage. In the illustrative examples, usage of processing resources can be reduced because of the selected routing of queries to a subset of nodes in the hierarchically organized computing system. This query scheme is in contrast to current techniques that query all of the nodes.

Further, the illustrative examples are conducive to scaling in the hierarchically organized computing system. This type of searching using data sketches can be applied to hierarchically organized computing systems with different number of nodes. A hierarchically organized computing system can be efficiently searched because a query is directed towards a subset of nodes in a manner that independent of the number of nodes present in the hierarchically organized computing system.

Additionally, the amount of communication occurring can be reduced by sending the query to fewer nodes and by avoiding moving the data from nodes at the edge of the hierarchically organized computing system to a centralized location as compared to current techniques that centralize data for searching. This reduction in communication can reduce network resource usage in the hierarchically organized computing system.

This reduction in communication can occur because the data resides where the data is generated, such as at the edge of the hierarchically organized computing system. Further, with data being spread out at the edges of the hierarchically organized computing system, security concerns can be reduced because most of the data remains secured at edge of the hierarchically organized computing system instead of needing to be secured at both at the edge and in other locations where the data placed into a database for searching.

In this illustrative example, the communication of data takes the form of data sketches rather than the actual data in the different nodes. As a result, data sketches can be smaller in size as compared to the size of the actual data at nodes in a hierarchy.

The group of processor units 314 can be configured to perform at least one of the steps, operations, or actions described in the different illustrative examples using software, hardware, firmware, or a combination thereof. As a result, the group of processor units 314 operates as a special purpose computer system in which data manager 316 running in the group of processor units 314 increasing efficiency in searching for data within a hierarchically organized computing system in which nodes are arranged in a hierarchy within the hierarchically organized computing system.

In the illustrative example, the use of data manager 316 running in the group of processor units 314 for data skipping in a hierarchically organized computing system that increases the performance of the group of processor units 314 in processing queries. This usage of data manager 316 is an integration into a practical application. In this example, this aggregation of data sketches enables increased efficiency in searching for data when queries are received at the intermediate nodes.

Data manager 316 running in the group of processor units 314 enables data skipping through the hierarchy of nodes in a particular organized computing system. This use of data skipping and data sketches reduces the number of nodes that processes queries. As result, the reduction in the amount of processing resources and time needed to search for data in the hierarchically organized computing system can occur.

Further, storage overhead can be minimized through the use of data sketches. In the illustrative examples, data sketches received at nodes are aggregated and propagated upward though the hierarchy of nodes. Data sketches are stored rather than copies of data in different locations as with many current techniques. The aggregated data sketches use less storage space as compared to sending copies of the data to centralized locations for searching.

Figure 5:
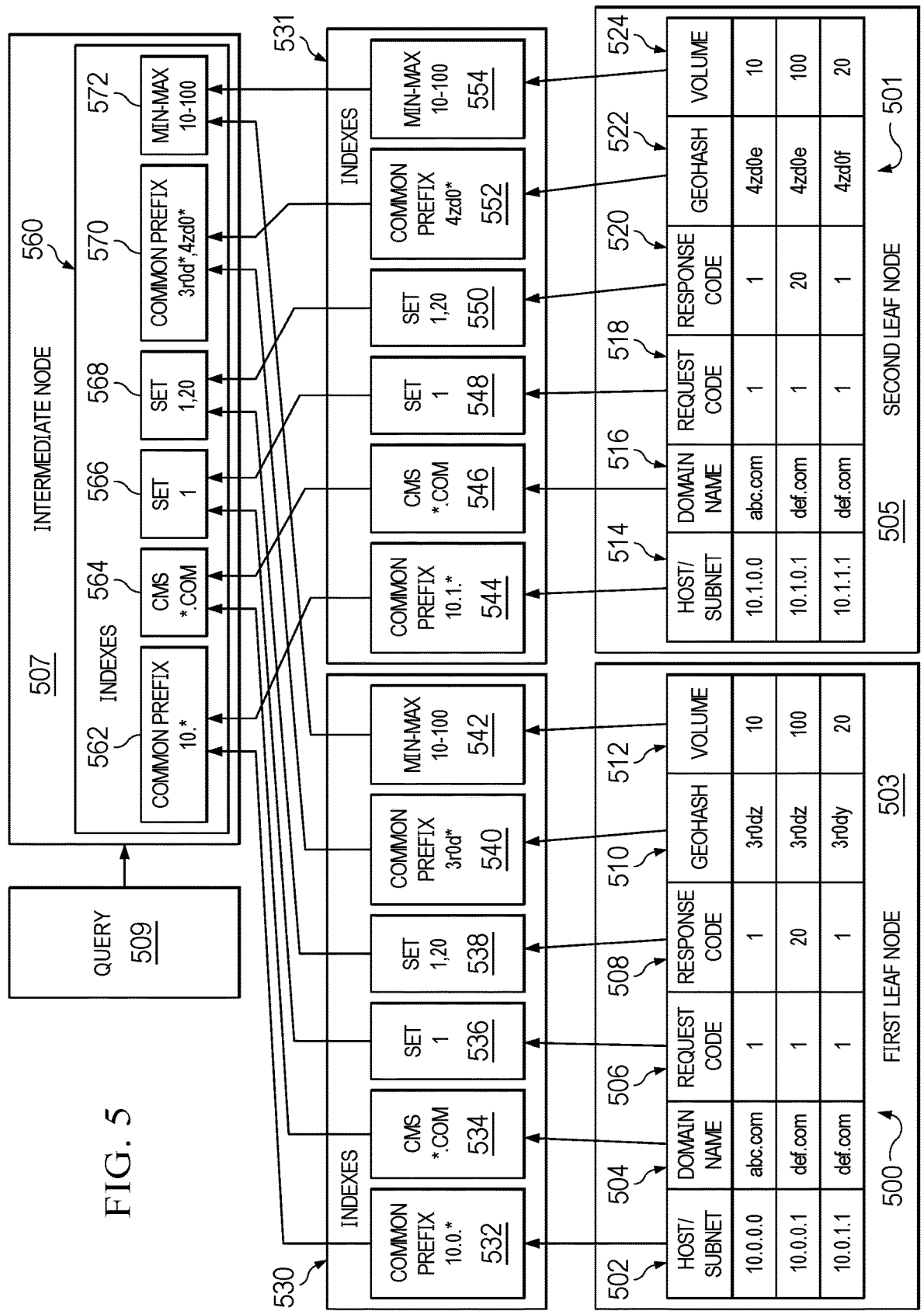
FIG. 5 is an illustration of data sketches in accordance with an illustrative embodiment.

The illustration of data skipping environment 300 and the different components in FIGS. 4-5 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, nodes 306 are shown as comprising root node 308, intermediate nodes 310, and leaf nodes 312. In other illustrative examples, additional nodes may be present in nodes 306. These nodes may have a hierarchical structure starting from the different root node without connections to root node 308, intermediate nodes 310, and leaf nodes 312.

With reference next to FIG. 5, an illustration of data sketches is depicted in accordance with an illustrative embodiment. In this illustrative example, an example of data in leaf nodes are shown in table 500 for first leaf node 503 node and table 501 for second leaf node 505. As depicted, table 500 and table 501 show examples of domain name system (DNS) log data that can be collected by leaf nodes in this example.

In this illustrative example, table 500 in first leaf node 503 has the following columns: host/subnet 502, domain name 504, request code 506, response code 508, geohash 510, and volume 512. Table 501 in second leaf node 505 has the following columns: host/subnet 514, domain name 516, request code 518, response code 520, geohash 522, and volume 524. These columns in table 500 for first leaf node 503 correspond to the columns in table 501 for second leaf node 505.

As depicted, table 500 in first leaf node 503 is summarized to generate leaf node data sketch 530. Table 501 in second leaf node 505 is summarized to generate leaf node data sketch 531.

In this example, leaf node data sketch 530 contains indexes to columns in table 500 with values for the indexes as follows: common prefix 532 for host/subnet 502 is 10.0.*, common suffix (CMS) 534 for domain name 504 is *.com, set 536 for request code 506 is 1, set 538 for response code 508 is 1, 20, common prefix 540 for geohash 510 is 3r0d*, and min-max 542 for volume 512 is 10-100. In this example, leaf node data sketch 531 contains indexes to columns in table 501 with values for the indexes as follows: common prefix 544 for host/subnet 514 is 10.1.*, common suffix (CMS) 546 for domain name 516 is *.com, set 548 for request code 518 is 1, set 550 for response code 520 is 1, 20, common prefix 552 for geohash 522 is 4zd0*, and min-max 554 for volume 524 is 10-100.

Leaf node data sketch 530 for first leaf node 503 and leaf node data sketch 531 for second leaf node 505 are received by intermediate node 507. First leaf node 503 and second leaf node 505 are child nodes to intermediate node 507 in this depicted example.

These leaf node data sketches are retained by intermediate node 507 for use in processing queries. Further, the intermediate leaf node also generates aggregated data sketch 560. Aggregated data sketch 560 is an aggregation of leaf node data sketch 530 and leaf node data sketch 531. As depicted, aggregated data sketch 560 has indexes that correspond to the indexes in leaf node data sketch 530 and leaf node data sketch 531.

As depicted, common prefix 562 is an aggregation of common prefix 532 and common prefix 544 that is 10.*; CMS 564 is an aggregation of CMS 534 and CMS 546 that is *.com; set 566 is an aggregation of set 536 and set 548 that is 1; set 568 is an aggregation of set 538 and set 550 that is 1, 20. Further, in this example, common prefix 570 is an aggregation of common prefix 540 and common prefix 552 that is 3r0d* and 4zd0*; and min-max 572 is a aggregation of min-max 542 and min-max 554 that is 10-100.

When a query 509 is received by intermediate node 507, query 509 is compared to leaf node data sketch 530 and leaf node data sketch 531 retained at intermediate node 507. Query 509 is forwarded only to child nodes having data sketches matching the query. For example, query 509 is compared to the indexes in leaf node data sketch 530 and leaf node data sketch 531.

In this illustrative example, the results from comparing query 509 to these retained data sketches are used to determine whether to send query 509 to first leaf node 503 and second leaf node 505. For example, if query 509 searches for a host subnet of 10.2.100.1, both of the leaf nodes that generated these leaf node data sketches can be skipped. As another example, if query 509 is searching for a host subnet of 10.1.2.2, query 509 is forwarded second leaf node 505 but is not forwarded to first leaf node 503. In this example, first leaf node 503 is skipped because first leaf node 503 does not contain the data being queried. Second leaf node 505 may contain the data being queried and is sent query 509 for processing.

The illustration of data sketches in FIG. 5 is provided as an example of one implementation and not meant to limit the manner which data sketches can be implemented in other illustrative examples. For example, the leaf node data sketches are shown as being generated from a single table. In other illustrative examples, one or more other tables can be used in addition to table 500 and table 501 to generate the leaf node data sketches. Further, this example shows to child nodes to intermediate node 507. In other illustrative examples, intermediate node 507 may have no child nodes, one child node, or three or more child nodes. In yet another illustrative example, intermediate node 507 may have data for which it generates a data sketch. When intermediate node 507 has data and generates a data sketch, that intermediate node is considered a leaf node for purposes of data sketch generation aggregation.

Figure 6:
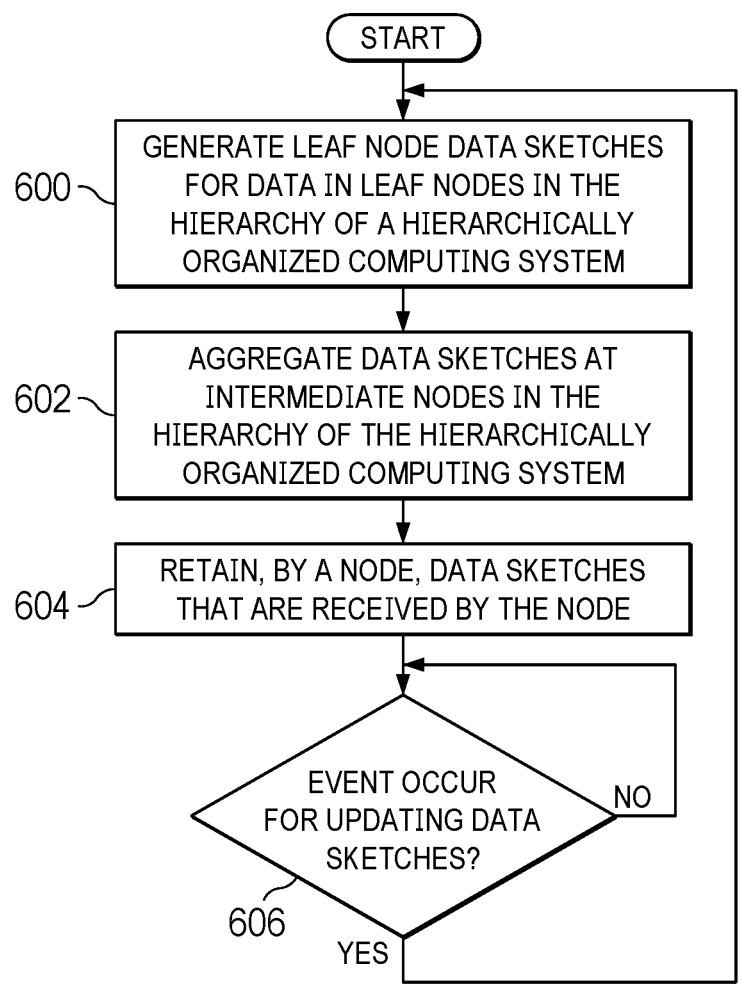
FIG. 6 is a flowchart of a process for generating data sketches for processing queries in accordance with an illustrative embodiment.

Turning next to FIG. 6, a flowchart of a process for generating data sketches for processing queries is depicted in accordance with an illustrative embodiment. The process in FIG. 6 can be implemented in hardware, software, or both. When implemented in software, the process can take the form of program instructions that is run by one of more processor units located in one or more hardware devices in one or more computer systems. For example, the process can be implemented in data manager 316 running on a group of processor units 314 in FIG. 3.

The process begins by generating leaf node data sketches for data in leaf nodes in the hierarchy of a hierarchically organized computing system (step 600). The process aggregates data sketches at intermediate nodes in the hierarchy of the hierarchically organized computing system (step 602). The process retains, by a node, data sketches that are received by the node (step 604). A determination is made as to whether an event occurs for updating data sketches (step 606). If the event occurs, the process returns to step 600. Otherwise, the process returns step 606.

Figure 7:
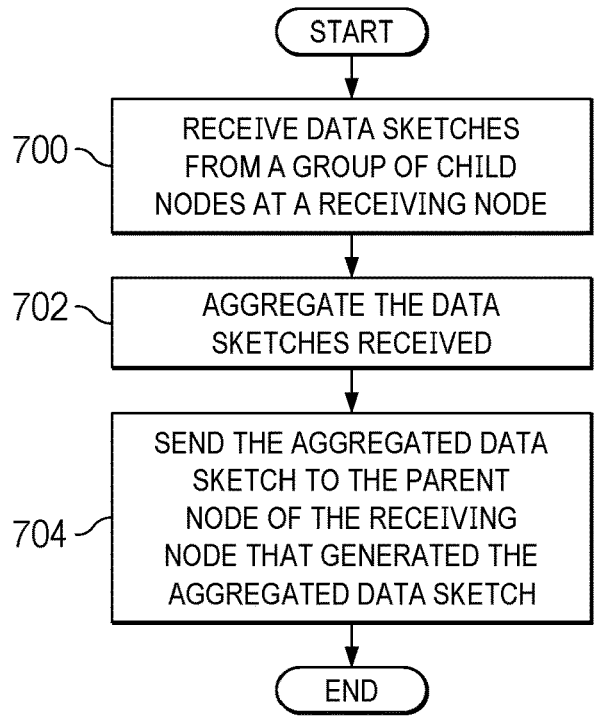
FIG. 7 is a flowchart of a process for aggregating data sketches in accordance with an illustrative embodiment.

With reference to FIG. 7, a flowchart of a process for aggregating data sketches is depicted in accordance with an illustrative embodiment. The process depicted in this flowchart is an example of an implementation for step 602 in FIG. 6. This process can be implemented in a parent node receiving data sketches from child nodes.

The process begins by receiving data sketches from a group of child nodes at a receiving node (step 700). In step 700, the data sketches can be leaf node data sketches if the data sketches received are generated from data in the child nodes that are leaf nodes. If the child nodes are intermediate nodes, the data sketches received are aggregated data sketches generated by the child nodes.

The process aggregates the data sketches received (step 702). In step 702, aggregation can be for leaf node data sketches or aggregated data sketches.

The process sends the aggregated data sketch to the parent node of the receiving node that generated the aggregated data sketch (step 704). The process terminates thereafter.

Figure 8:
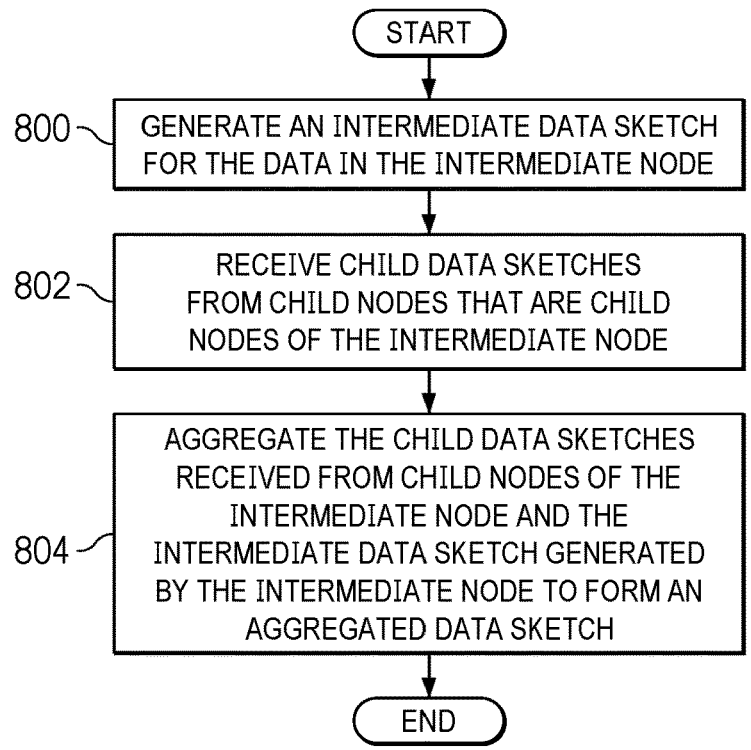
FIG. 8 is a flowchart of a process for aggregating data in an intermediate node in accordance with an illustrative embodiment.

Turning next to FIG. 8, a flowchart of a process for aggregating data in an intermediate node is depicted in accordance with an illustrative embodiment. The process in FIG. 8 can be implemented in hardware, software, or both. When implemented in software, the process can take the form of program instructions that is run by one of more processor units located in one or more hardware devices in one or more computer systems. For example, the process can be implemented in data manager 316 running on a group of processor units 314 in FIG. 3. In this example, an intermediate node can also be a data generator. The intermediate node can generate a data sketch for the data at the intermediate node. This data used by the intermediate node to generate the data sketch is data other than data sketches.

The process begins by generating an intermediate data sketch for the data in the intermediate node (step 800). The process receives child data sketches from child nodes that are child nodes of the intermediate node (step 802).

The process aggregates the child data sketches received from child nodes of the intermediate node and the intermediate data sketch generated by the intermediate node to form an aggregate data sketch (step 804). The process terminates thereafter.

Figure 9:
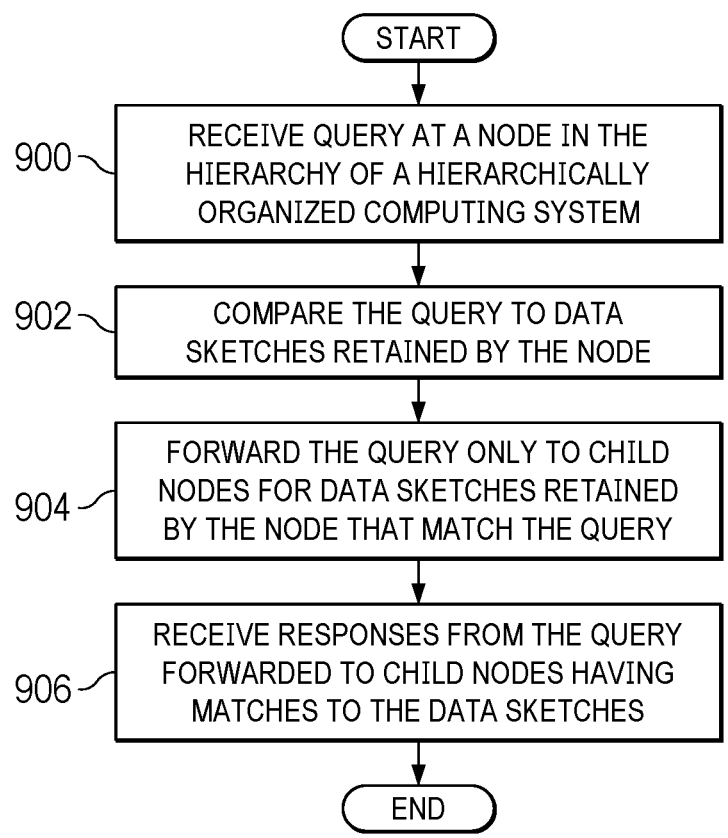
FIG. 9 is a flowchart of a process for querying data using data sketches in accordance with an illustrative embodiment.

With reference now to FIG. 9, a flowchart of a process for querying data using data sketches is depicted in accordance with an illustrative embodiment. The process in FIG. 9 can be implemented in hardware, software, or both. When implemented in software, the process can take the form of program instructions that is run by one of more processor units located in one or more hardware devices in one or more computer systems. For example, the process can be implemented in data manager 316 running on a group of processor units 314 in FIG. 3.

The process begins by receiving query at a node in the hierarchy of a hierarchically organized computing system (step 900). In step 900, the node can be an intermediate node or a root node.

The process compares the query to data sketches retained by the node (step 902). The process forwards the query only to child nodes for data sketches retained by the node that match the query (step 904). The process receives responses from the query forwarded to child nodes having matches to the data sketches (step 906). The process terminates thereafter.

Figure 10:
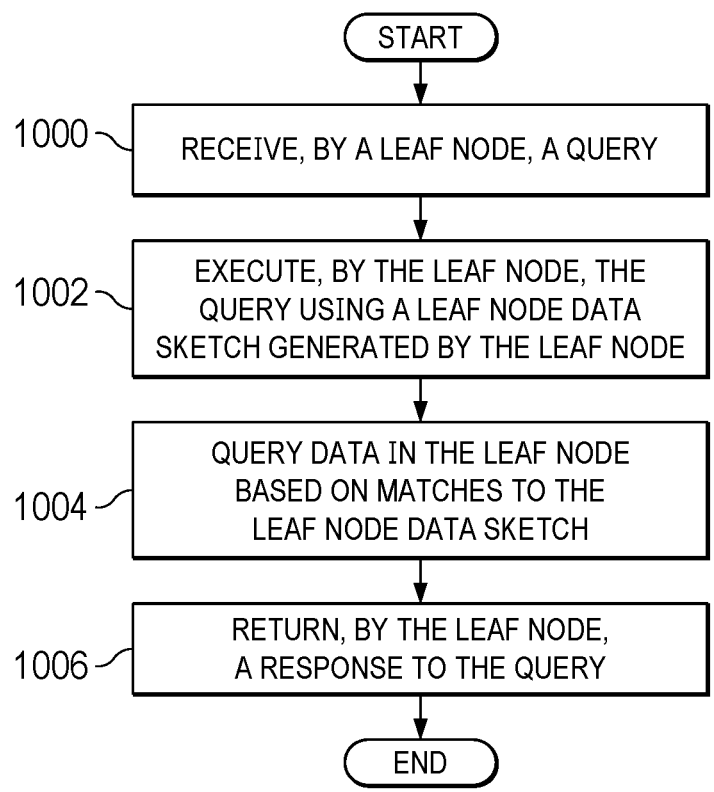
FIG. 10 is a flowchart of a process for processing a query at a leaf node in accordance with an illustrative embodiment.

With reference now to FIG. 10, a flowchart of a process for processing a query at a set of leaf nodes is depicted in accordance with an illustrative embodiment. The process in FIG. 10 can be implemented in hardware, software, or both. When implemented in software, the process can take the form of program instructions that is run by one of more processor units located in one or more hardware devices in one or more computer systems. For example, the process can be implemented in data manager 316 running on a group of processor units 314 in FIG. 3.

The process begins by a leaf node receiving a query (step 1000). The leaf node executes the query using leaf node data sketch generated by the leaf node (step 1002).

Data is queried in the leaf node based on matches to the leaf node data sketch (step 1004). In step 1004, the data sketch used by the leaf node can be used to determine what tables or data structures should or should not be searched. The query can be executed on the leaf node data sketch to determine what columns, tables, or other data structure should be skipped searching for the data matching the query. In this example, using the leaf node data sketches is optional. In some illustrative examples, the query can be executed using indexes to identify matching information and search for data responsive to the query instead of using the query to skip data structures.

The leaf node returns a response to the query (step 1006). The process terminates thereafter. In step 1006, the leaf node can send the response directly back to the intermediate node that received the query. In another illustrative example, the leaf node can send the response to the node that forwarded the query to the leaf node. In this example, the response is forwarded back through the path to the node receiving the query for processing.

Figure 11:
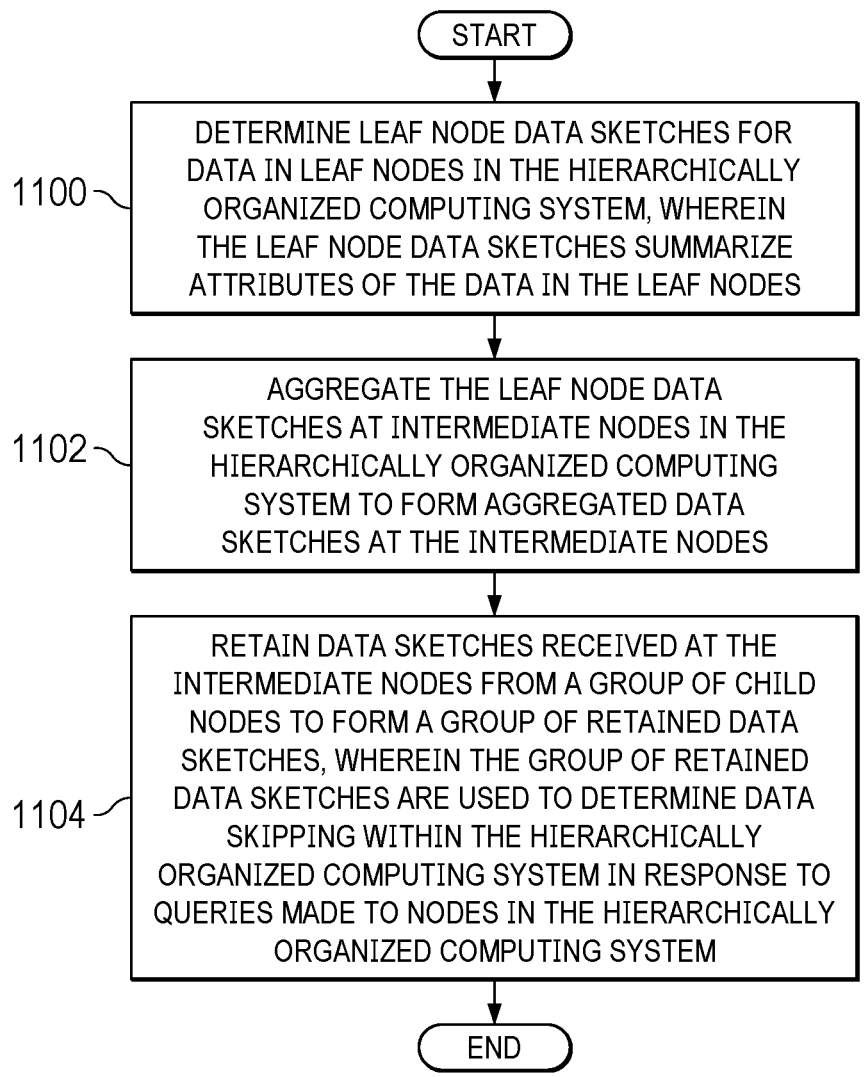
FIG. 11 is a flowchart of a process for determining leaf node data sketches in accordance with an illustrative embodiment.

Turning next to FIG. 11, a flowchart of a process for determining leaf node data sketches is depicted in accordance with an illustrative embodiment. The process in FIG. 11 can be implemented in hardware, software, or both. When implemented in software, the process can take the form of program instructions that is run by one of more processor units located in one or more hardware devices in one or more computer systems. For example, the process can be implemented in data manager 316 running on a group of processor units 314 in FIG. 3.

The process begins by determining leaf node data sketches for data in leaf nodes in the hierarchically organized computing system, wherein the leaf node data sketches summarize attributes of the data in the leaf nodes (step 1100). The process aggregates the leaf node data sketches at intermediate nodes in the hierarchically organized computing system to form aggregated data sketches at the intermediate nodes (step 1102). The process retains data sketches received at the intermediate nodes from a group of child nodes to form a group of retained data sketches, wherein the group of retained data sketches is used to determine data skipping within the hierarchically organized computing system in response to queries made to nodes in the hierarchically organized computing system (step 1104). The process terminates thereafter.

Figure 12:
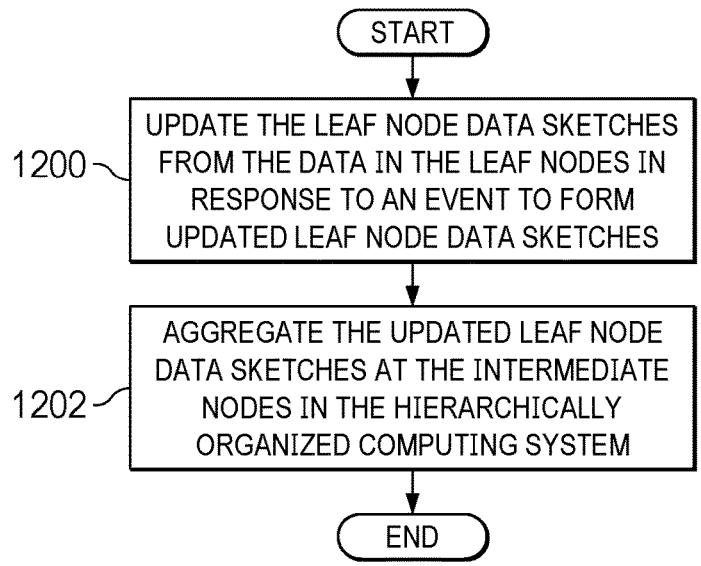
FIG. 12 is a flowchart of a process for updating leaf node data sketches in accordance with an illustrative embodiment.

With reference to FIG. 12, a flowchart of a process for updating leaf node data sketches is depicted in accordance with an illustrative embodiment. The steps in FIG. 12 are examples of additional steps that can be used with the steps in the process in FIG. 11.

The process begins by updating the leaf node data sketches from the data in the leaf nodes in response to an event to form updated leaf node data sketches (step 1200). The process aggregates the updated leaf node data sketches at the intermediate nodes in the hierarchically organized computing system (step 1202). The process terminates thereafter.

Figure 13:
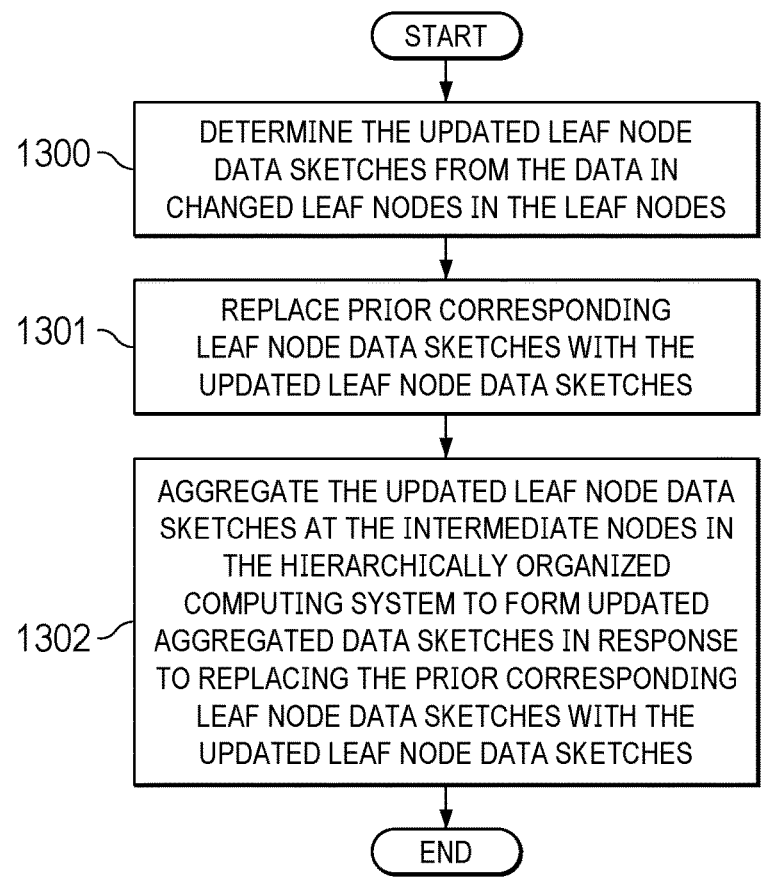
FIG. 13 is a flowchart of a process for determining updated leaf node data sketches in accordance with an illustrative embodiment.

With reference now to FIG. 13, a flowchart of a process for determining updated leaf node data sketches is depicted in accordance with an illustrative embodiment. The process illustrated in FIG. 13 is an example of one implementation for step 1200 in FIG. 12.

The process begins by determining the updated leaf node data sketches from the data in changed leaf nodes in the leaf nodes (step 1300). The process replaces prior corresponding leaf node data sketches with the updated leaf node data sketches (step 1301). The process aggregates the updated leaf node data sketches at the intermediate nodes in the hierarchically organized computing system to form updated aggregated data sketches in response to replacing the prior corresponding leaf node data sketches with the updated leaf node data sketches (step 1302). The process terminates thereafter.

Figure 14:
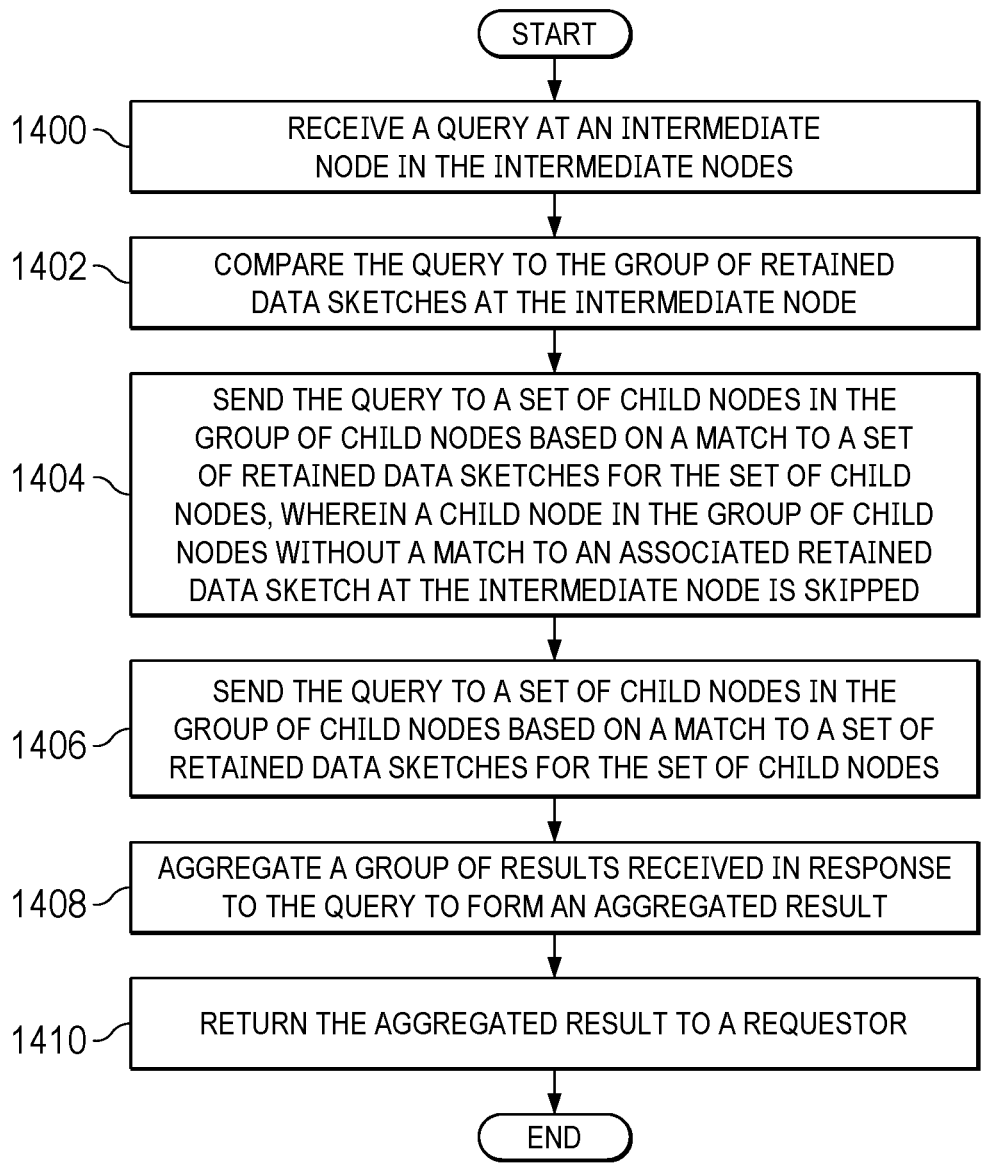
FIG. 14 is a flowchart of a process for receiving a query at an intermediate node in accordance with an illustrative embodiment.

Turning next to FIG. 14, a flowchart of a process for receiving a query at an intermediate node is depicted in accordance with an illustrative embodiment. The steps in FIG. 14 are examples of additional steps that can be used with the steps in the process in FIG. 11.

The process begins by receiving a query at an intermediate node in the intermediate nodes (step 1400). The process compares the query to the group of retained data sketches at the intermediate node (step 1402). The process sends the query to a set of child nodes in the group of child nodes based on a match of the query to a set of retained data sketches for the set of child nodes (step 1404).

The process sends the query to a set of child nodes in the group of child nodes based on a match to a set of retained data sketches for the set of child nodes, wherein a child node in the group of child nodes without a match to an associated retained data sketch at the intermediate node is skipped (step 1406). The process aggregates a group of results received in response to the query to form an aggregated result (step 1408).

The process returns the aggregated result to a requestor (step 1410). The process terminates thereafter.

Figure 15:
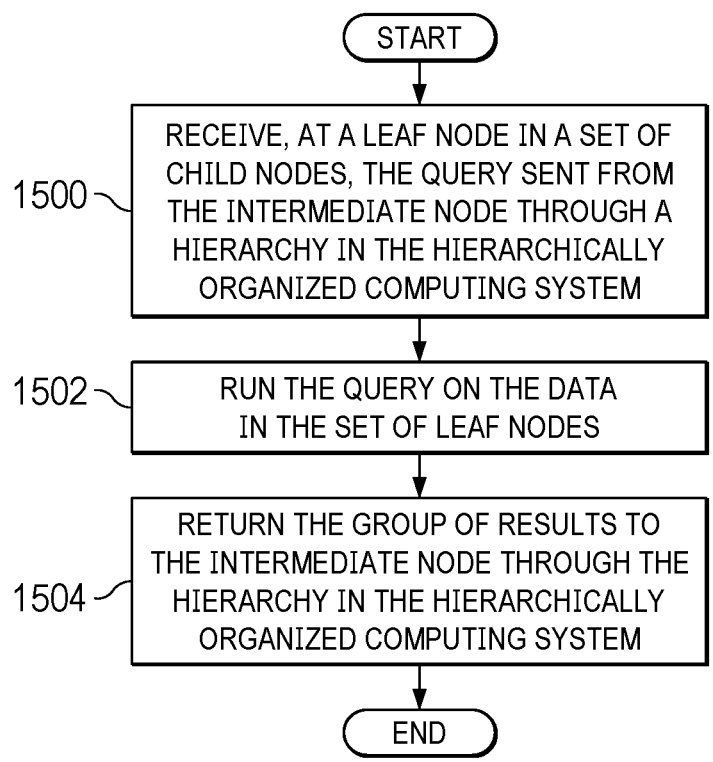
FIG. 15 is a flowchart of a process for processing a query at a leaf node in accordance with an illustrative embodiment.

With reference to FIG. 15, a flowchart of a process for processing a query at a leaf node is depicted in accordance with an illustrative embodiment. The steps in FIG. 15 are examples of additional steps that can be used with the steps in the process in FIG. 14. In this example, the steps can be performed by a leaf node.

The process begins by receiving, at a leaf node in a set of child nodes, the query sent from the intermediate node through a hierarchy in the hierarchically organized computing system (step 1500). The process runs the query on the data in the set of leaf nodes (step 1502). The process returns the group of results to the intermediate node through the hierarchy in the hierarchically organized computing system (step 1504). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 16:
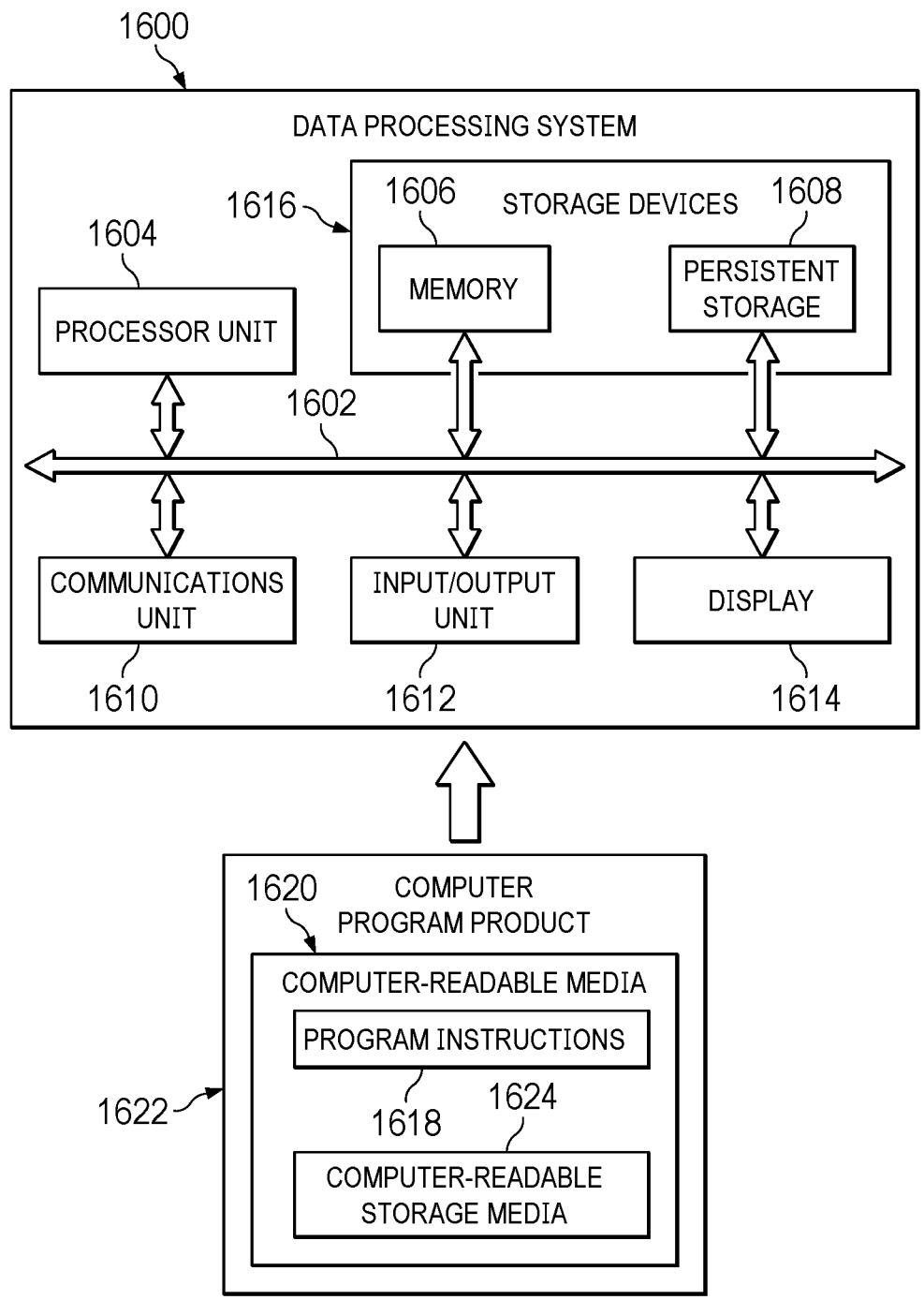
FIG. 16 is a block diagram of a data processing system in accordance with an illustrative embodiment.

Turning now to FIG. 16, a block diagram of a data processing system is depicted in accordance with an illustrative embodiment. Data processing system 1600 can be used to implement computers and computing devices in computing environment 100 in FIG. 1. Additionally, data processing system 1600 can be used to implement server computer 204, server computer 206, client devices 210, in FIG. 2. Data processing system 1600 can also be used to implement computer system 320 and nodes 306 in hierarchically organized computing system 304 in FIG. 3. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1604 can may be implemented using one or more heterogeneous processor systems in which a main processor is present with secondary processors on a single chip. As another illustrative example, processor unit 1604 can be a symmetric multi-processor system containing multiple processors of the same type on a single chip.

Memory 1606 and persistent storage 1608 are examples of storage devices 1616. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 may take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which may be located in a memory, such as memory 1606.

These instructions are referred to as program instructions, computer usable program instructions, or computer-readable program instructions that can be read and executed by a processor in processor unit 1604. The program instructions in the different embodiments can be embodied on different physical or computer-readable storage media, such as memory 1606 or persistent storage 1608.

Program instructions 1618 is located in a functional form on computer-readable media 1620 that is selectively removable and can be loaded onto or transferred to data processing system 1600 for execution by processor unit 1604. Program instructions 1618 and computer-readable media 1620 form computer program product 1622 in these illustrative examples. In the illustrative example, computer-readable media 1620 is computer-readable storage media 1624.

Computer-readable storage media 1624 is a physical or tangible storage device used to store program instructions 1618 rather than a medium that propagates or transmits program instructions 1618. Computer-readable storage media 1624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1618 can be transferred to data processing system 1600 using a computer-readable signal media. The computer-readable signal media are signals and can be, for example, a propagated data signal containing program instructions 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1620" can be singular or plural. For example, program instructions 1618 can be located in computer-readable media 1620 in the form of a single storage device or system. In another example, program instructions 1618 can be located in computer-readable media 1620 that is distributed in multiple data processing systems. In other words, some instructions in program instructions 1618 can be located in one data processing system while other instructions in program instructions 1618 can be located in one data processing system. For example, a portion of program instructions 1618 can be located in computer-readable media 1620 in a server computer while another portion of program instructions 1618 can be located in computer-readable media 1620 located in a set of client computers.

The different components illustrated for data processing system 1600 are not meant to provide architectural limitations to the manner in which different embodiments can be implemented. In some illustrative examples, one or more of the components may be incorporated in or otherwise form a portion of, another component. For example, memory 1606, or portions thereof, may be incorporated in processor unit 1604 in some illustrative examples. The different illustrative embodiments can be implemented in a data processing system including components in addition to or in place of those illustrated for data processing system 1600. Other components shown in FIG. 16 can be varied from the illustrative examples shown. The different embodiments can be implemented using any hardware device or system capable of running program instructions 1618.

Thus, illustrative embodiments of the present invention provide a computer implemented method, computer system, and computer program product for data skipping in a hierarchically organized computing system. In one illustrative example, a computer implemented method determines leaf node data sketches for data in leaf nodes in the hierarchically organized computing system. The leaf node data sketches summarize attributes of the data in the leaf nodes. The leaf node data sketches are aggregated at intermediate nodes in the hierarchically organized computing system to form aggregated data sketches at the intermediate nodes. Data sketches received at the intermediate nodes from a group of child nodes are retained to form a group of retained data sketches. The group of retained data sketches is used to determine data skipping within the hierarchically organized computing system in response to queries made to nodes in the hierarchically organized computing system.

In the illustrative examples, reduce usage of processing resources occur because of the selected routing of queries to different nodes in the hierarchically organized computing system. In the illustrative example, queries run in relevant nodes are based on matches of queries to data sketches. Data sketches not matching queries result in nodes associated with those data sketches being skipped for processing the query.

This query scheme is in contrast to current techniques that query all of the nodes. Further, the illustrative examples are conducive to scaling in the hierarchically organized computing system. As the number of nodes increases in hierarchically organized computing system, a query is directed towards a subset of nodes independent of the number of nodes in the hierarchically organized computing system. As a result, an increase in the number of nodes through scaling does not necessarily increase the amount of processing resources needed to search for data using data sketches and data skipping in the different illustrative examples.

Further, reduced communications can occur, reducing usage of network resources in the hierarchically organized computing system. This reduction in communication can occur because the data resides where the data is generated, such as at the edge of the hierarchically organized computing system instead of sending the data to a centralized location. Further, with data being spread out at the edges of the hierarchically organized computing system, reduced security concerns occur because most of the data remains private at the edge of the hierarchically organized computing system. In this illustrative example, the communication of data takes the form of data sketches rather than the actual data in the different nodes. As a result, data sketches can be independent with respect to size as compared to the data level of the node in a hierarchy.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for data skipping in a hierarchically organized computing system, the computer implemented method comprising:
    determining, by a group of processor units, leaf node data sketches for data in leaf nodes in the hierarchically organized computing system, wherein the leaf node data sketches summarize attributes of the data in the leaf nodes;
    aggregating, by the group of processor units, the leaf node data sketches at intermediate nodes in the hierarchically organized computing system to form aggregated data sketches at the intermediate nodes;
    retaining, by the group of processor units, data sketches received at the intermediate nodes from a group of child nodes to form retained data sketches, wherein the retained data sketches are one of leaf node data sketches and the aggregated data sketches;
    searching, by the group of processor units, the data using the retained data sketches and the data skipping within the hierarchically organized computing system in response to queries made to the intermediate nodes in the hierarchically organized computing system;
    wherein the leaf nodes in the hierarchically organized computing system are client devices and the intermediate nodes in the hierarchically organized computing system are server computers, and further comprising:
    updating, by the group of processor units, the leaf node data sketches from the data in the leaf nodes in response to an event to form updated leaf node data sketches; and
    aggregating, by the group of processor units, the updated leaf node data sketches at the intermediate nodes in the hierarchically organized computing system.

2. The computer implemented method of claim 1, wherein the event is one of a periodic event and a non-periodic event.

3. The computer implemented method of claim 1, wherein updating the leaf node data sketches from the data in the leaf nodes comprises:
    determining, by the group of processor units, the updated leaf node data sketches from the data in changed leaf nodes, which are a subset of the leaf nodes;
    replacing prior corresponding leaf node data sketches with the updated leaf node data sketches; and
    aggregating, by the group of processor units, the updated leaf node data sketches at the intermediate nodes in the hierarchically organized computing system to form updated aggregated data sketches in response to replacing the prior corresponding leaf node data sketches with the updated leaf node data sketches.

4. The computer implemented method of claim 1, wherein an intermediate node in the intermediate nodes is a data generator and the method further comprising:
    generating an intermediate data sketch for the data in the intermediate node; and
    aggregating child data sketches received from child nodes of the intermediate node and the intermediate data sketch generated by the intermediate node to form an aggregated data sketch.

5. The computer implemented method of claim 1 further comprising:

receiving, by the group of processor units, a query at an intermediate node in the intermediate nodes, comparing, by the group of processor units, the query to the group of retained data sketches at the intermediate node;

sending, by the group of processor units, the query to a set of child nodes in the group of child nodes based on a match of the query to a set of retained data sketches for the set of child nodes, wherein a child node in the group of child nodes is skipped when a retained data sketch received from the child node does not have a match to an associated retained data sketch at the intermediate node;

aggregating, by the group of processor units, a group of results received in response to the query to form an aggregated result; and returning, by the group of processor units, the aggregated result to a requestor.

6. The computer implemented method of claim 5 further comprising:

receiving, at a leaf node in the set of child nodes, the query sent from the intermediate node through a hierarchy in the hierarchically organized computing system;

running the query on the data in the leaf node; and returning a result to the intermediate node through the hierarchy in the hierarchically organized computing system.

7. A computer system comprising:

a group of processor units, wherein the group of processor units executes program instructions to:

determine leaf node data sketches for data in leaf nodes in a hierarchically organized computing system, wherein the leaf node data sketches summarize attributes of the data in the leaf nodes;

aggregate the leaf node data sketches at intermediate nodes in the hierarchically organized computing system to form aggregated data sketches at the intermediate nodes;

retain data sketches received at the intermediate nodes from a group of child nodes to form retained data sketches, wherein the retained data sketches are one of leaf node data sketches and the aggregated data sketches;

search the data using the retained data sketches and the data skipping within the hierarchically organized computing system in response to queries made to the intermediate nodes in the hierarchically organized computing system;

wherein the leaf nodes in the hierarchically organized computing system are client devices and the intermediate nodes in the hierarchically organized computing system are server computers, and wherein the group of processor units executes program instructions to:

update the leaf node data sketches from the data in the leaf nodes in response to an event to form updated leaf node data sketches; and aggregate the updated leaf node data sketches at the intermediate nodes in the hierarchically organized computing system.

8. The computer system of claim 7, wherein the event is one of a periodic even and a non-periodic event.

9. The computer system of claim 7, wherein as part of updating the leaf node data sketches from the data in the leaf nodes, the group of processor units executes program instructions to:

determine the updated leaf node data sketches from the data in changed leaf nodes, which are a subset of the leaf nodes;

replacing prior corresponding leaf node data sketches with the updated leaf node data sketches; and aggregate the updated leaf node data sketches at the intermediate nodes in the hierarchically organized computing system to form updated aggregated data sketches in response to replacing the prior corresponding leaf node data sketches with the updated leaf node data sketches.

10. The computer system of claim 7, wherein an intermediate node in the intermediate nodes is a data generator and the group of processor units executes program instructions to:

generate an intermediate data sketch for the data in the intermediate node; and aggregate child data sketches received from child nodes of the intermediate node and the intermediate data sketch generated by the intermediate node to form an aggregate data sketch.

11. The computer system of claim 7, wherein the group of processor units executes program instructions to:

receive a query at an intermediate node in the intermediate nodes, compare the query to the group of retained data sketches at the intermediate node;

send the query to a set of child nodes in the group of child nodes based on a match of the query to a set of retained data sketches for the set of child nodes, wherein a child node in the group of child nodes is skipped when a retained data sketch received from the child node does not have a match to an associated retained data sketch at the intermediate node;

aggregate a group of results received in response to the query to form an aggregated result; and returning, by the group of processor units, the aggregated result to a requestor.

12. The computer system of claim 11, wherein the group of processor units executes program instructions to:

receive, at a leaf node in the set of child nodes, the query sent from the intermediate node through a hierarchy in the hierarchically organized computing system;

run the query on the data in the leaf node; and return a result to the intermediate node through the hierarchy in the hierarchically organized computing system.

13. A computer program product for data skipping in a hierarchically organized computing system, the computer program product comprising a computer readable storage medium having program instructions embodied therewith, the program instructions executable by a computer system to cause the computer system to perform a method of:

determining, by a group of processor units, leaf node data sketches for data in leaf nodes in the hierarchically organized computing system, wherein the leaf node data sketches summarize attributes of the data in the leaf nodes;

aggregating, by the group of processor units, the leaf node data sketches at intermediate nodes in the hierarchically organized computing system to form aggregated data sketches at the intermediate nodes;

retaining, by the group of processor units, data sketches received at the intermediate nodes from a group of child nodes to form retained data sketches, wherein the retained data sketches are one of leaf node data sketches and the aggregated data sketches; and searching, by the group of processor units, the data using the retained data sketches and the data skipping within the hierarchically organized computing system in response to queries made to the intermediate nodes in the hierarchically organized computing system;

wherein the leaf nodes in the hierarchically organized computing system are client devices, and the intermediate nodes in the hierarchically organized computing system are server computers and wherein the method performed by the computer system further comprises:

updating, by the group of processor units, the leaf node data sketches from the data in the leaf nodes in response to an event to form updated leaf node data sketches; and aggregating, by the group of processor units, the updated leaf node data sketches at the intermediate nodes in the hierarchically organized computing system.

14. The computer program product of claim 13, wherein the event is one of a periodic even and a non-periodic event.

15. The computer program product of claim 13, wherein as part of updating the leaf node data sketches from the data in the leaf nodes, the method performed by the computer system comprises:

determining, by the group of processor units, the updated leaf node data sketches from the data in changed leaf nodes, which are a subset of the leaf nodes;

replacing prior corresponding leaf node data sketches with the updated leaf node data sketches; and aggregating, by the group of processor units, the updated leaf node data sketches at the intermediate nodes in the hierarchically organized computing system to form updated aggregated data sketches in response to replacing the prior corresponding leaf node data sketches with the updated leaf node data sketches.

16. The computer program product of claim 13, wherein an intermediate node in the intermediate nodes is a data generator and wherein the method performed by the computer system further comprises:

generating an intermediate data sketch for the data in the intermediate node; and aggregating child data sketches received from child nodes of the intermediate node and the intermediate data sketch generated by the intermediate node to form an aggregated data sketch.

17. The computer program product of claim 13, wherein the method performed by the computer system further comprises:

receiving, by the group of processor units, a query at an intermediate node in the intermediate nodes, comparing, by the group of processor units, the query to the group of retained data sketches at the intermediate node;

sending, by the group of processor units, the query to a set of child nodes in the group of child nodes based on a match of the query to a set of retained data sketches for the set of child nodes, wherein a child node in the group of child nodes is skipped when a retained data sketch received from the child node does not have a match to an associated retained data sketch at the intermediate node;

aggregating, by the group of processor units, a group of results received in response to the query to form an aggregated result; and returning, by the group of processor units, the aggregated result to a requestor.

\* \* \* \* \*